US012057080B2

(12) United States Patent
Wong et al.

(10) Patent No.: US 12,057,080 B2
(45) **Date of Patent: *Aug. 6, 2024**

(54) LIGHT SOURCE DRIVING CIRCUIT AND COMMUNICATION DEVICE FOR DISPLAY SYSTEM

(71) Applicant: Joulwatt Technology Co., Ltd., Hangzhou (CN)

(72) Inventors: Pitleong Wong, Hangzhou (CN); Duo Li, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,529

(22) Filed: Dec. 21, 2022

(65) Prior Publication Data

US 2023/0386420 A1 Nov. 30, 2023

(30) Foreign Application Priority Data

May 27, 2022 (CN) ......................... 202210591805.2

(51) Int. Cl.
*G09G 3/34* (2006.01)
*G09G 3/20* (2006.01)
*G09G 3/36* (2006.01)

(52) U.S. Cl.
CPC ........... *G09G 3/342* (2013.01); *G09G 3/2096* (2013.01); *G09G 3/3685* (2013.01); *G09G 3/36* (2013.01); *G09G 2320/0626* (2013.01); *G09G 2330/026* (2013.01)

(58) Field of Classification Search
CPC .... G09G 3/342; G09G 3/2096; G09G 3/3685; G09G 3/36; G09G 2320/0626; G09G 2330/026; G09G 2370/10; G09G 3/3426; G09G 3/3216; G09G 3/32; G09G 3/3406
See application file for complete search history.

(56) References Cited

U.S. PATENT DOCUMENTS 10,909,911 B1 * 2/2021 Zheng ...................... G09G 5/10
2010/0309100 A1 * 12/2010 Cok ..................... G09G 3/3208 345/76
2021/0366391 A1 * 11/2021 Wei ...................... G09G 3/3208
(Continued)

*Primary Examiner* — Temesghen Ghebretinsae
*Assistant Examiner* — Karin Kiyabu
(74) *Attorney, Agent, or Firm* — Bayramoglu Law Offices LLC

(57) ABSTRACT

A light source driving circuit and a communication device for display system are provided. The communication device includes a control unit and at least one string light source driving circuit. The control unit includes an output interface for transmitting control commands or data and a data reading back input interface. Each string light source driving circuit includes a plurality of light source driving circuits, and each light source driving circuit interface includes a serial input interface, a serial output interface, parallel interfaces, and at least one current output interface. The serial input interface and serial output interface of the plurality of light source driving circuits are cascaded with each other as a first channel of the control commands or data transmission. The parallel interfaces of each driving circuit in the plurality of driving circuits are coupled with each other as a second channel of the control commands and data transmission.

23 Claims, 7 Drawing Sheets

(56) References Cited

U.S. PATENT DOCUMENTS

| | | | | |
|---|---|---|---|---|
| 2022/0020310 | A1* | 1/2022 | Gray | G09G 3/2088 |
| 2023/0282156 | A1* | 9/2023 | Wong | G09G 3/32<br>345/690 |
| 2023/0386419 | A1* | 11/2023 | Wong | G09G 3/3685 |

* cited by examiner

Notes:
SDO_Tx: TX controller SDO port waveform
SDO_Rxn(n=1,2,..,N) : Rxn(n=1,2,..,N) Driver SDO Port Waveform

LIGHT SOURCE DRIVING CIRCUIT AND COMMUNICATION DEVICE FOR DISPLAY SYSTEM

CROSS REFERENCE TO THE RELATED APPLICATIONS

This application is based upon and claims priority to Chinese Patent Application No. 202210591805.2, filed on May 27, 2022, the entire contents of which are incorporated herein by reference.

TECHNICAL FIELD

The present application relates to the field of electronic circuits, more specifically, to a light source driving circuit and a communication device for a display system.

BACKGROUND

As a self-luminous element, LED is widely used in display systems. In LED display screens, LEDs are used as pixel elements to display images. In liquid crystal displays (LCDs), LEDs provide backlight as light sources. With the improvement of display quality, the number of LEDs used in the display system is increasing, whether as pixel units or as light sources.

In the LCDs, the liquid crystal molecules do not emit light themselves, and the LED arrays in the backlight module (BLU) form a surface light source to provide sufficient brightness and evenly distributed backlight. The luminous effect and color gamut range of the backlight module affect the LCD display quality. With the market's demand for high-quality display, multi-partitioned straight down mini-LED backlight technology has been developed to achieve high brightness, high color gamut, high contrast and energy saving of LCD display.

Currently, the mini-LED backlight driving is gradually transferred from the passive driving technology to the active driving technology, while the number of light-emitting chips of active backlight is often tens of thousands, or even hundreds of thousands. Therefore, there is high requirement for the accuracy, precision, speed, etc. of multiple mini-LED drivers. Therefore, it is a great challenge to realize an LED drive system with simple interface wiring, high transmission rate and high reliability to improve the efficiency of backlight system.

SUMMARY

In view of this, the objective of the present application is to provide a light source driving system and a communication device for a display system, so as to resolve the technical problem that plural light source backlight drivers have low transmission rate and insufficient accuracy.

The present invention provides a communication device for a display stem, including: a control unit, which includes a first output interface for transmitting control commands or data and a reading back data input interface, the commands including at least one of a configuration data packet, a brightness data packet, a detection data packet, address data, a device address storage data packet, and reading back commands; at least one string light source driving circuit, each string light source driving circuit including a plurality of light source driving circuits, and each light source driving circuit includes: a serial input interface, a serial output interface, parallel interfaces, and at least one current output interface; the serial input interface and the serial output interface of the plurality of light source driving circuits are cascaded with each other as a first channel of the control commands or data transmission; the parallel interfaces of each driving circuit in the plurality of driving circuits are coupled with each other as a second channel of the control commands and data transmission, wherein the commands and data transmitted simultaneously by the first channel and the second channel are at least one of the configuration data packet, the brightness data packet, the detection data packet and the reading back commands.

Preferably, the control unit transmits the address data to a first driving circuit of the string light source driving circuit via the first output interface; the first driving circuit takes out the address data required by the current stage, and then repackages the address data of the remaining driving circuits, and transmits the repackaged data packets through the serial output interface, and a light source driving circuit of the following stage transmits the address data sequentially.

Preferably, the control unit further includes a second output interface; the control data transmits at least one of the configuration data packet, the brightness data packet, the detection data packet and the reading back commands to the first driving circuit through the first output interface, then the plurality of light source driving circuits sequentially transmit backwards through the data transmission channel formed of the serial input interface and the serial output interface; and, the control unit transmits at least one of the configuration data packet, the brightness data packet, the detection data packet and the reading back commands to the parallel interfaces of all the light source driving circuits through the second output interface.

Preferably, the control unit transmits at least one of the configuration data packet, the brightness data packet, the detection data packet and the reading back commands to the first driving circuit of the string light source driving circuit through the first output interface; the first driving circuit takes out the control commands or data required by the current stage after receiving the control commands or data through the serial input interface, and then repackages the commands or data of the remaining driving circuits, and transmits the repackaged data packets through the serial output interface and the parallel interface of the current stage; the driving circuits of the second and the following stages receive the commands or data through the serial input interface and the parallel interfaces of the current stage, take out the commands or data required by the current stage, then repackage the commands or data of the remaining driving circuits, and transmit the repackaged data packet through the serial output interface and the parallel interfaces of current stage.

Preferably, the light source driving circuit works at an addressing phase, a configuration phase, and a luminous phase successively; the control unit outputs the address data at the addressing phase, outputs the configuration data at the configuration phase, and outputs brightness data at the luminous phase.

Preferably, the control unit transmits the device address storage command to each light source driving circuit through the output interface, and each light source driving circuit burns the assigned address data to its storage device.

Preferably, the first driving circuit serial input interface in each string light source driving circuit is coupled to the first output interface of the control unit, the serial input interfaces of the remaining each driving circuit are coupled to the serial output interface of the previous driving circuit, and the parallel interfaces of the remaining each driving circuit are coupled to the parallel interface of the first driving circuit; the last driving circuit serial output interfaces of each light source driving circuit are connected to the reading back data input interface of the control unit.

Preferably, the first driving circuit serial input interface of each string light source driving circuit is coupled to the first output interface of the control unit, and the serial input interface of the each remaining driving circuit is coupled to the serial output interface of the previous driving circuit; the parallel interfaces of each driving circuit are all coupled to the second output interface of the control unit; the last driving circuit serial output interface of each light source driving circuit is connected to the reading back data input interface of the control unit.

Preferably, the parallel interfaces of the plurality of light source driving circuits are bi-directional tri-state ports.

Preferably, after the control unit transmits the reading back command to the light source driving circuit, the light source driving circuit that currently receives the reading back commands determines whether to return the reading back data of the current stage to the control unit according to whether the address of the current stage is consistent with the address of the device that needs to return data in the reading back command, the plurality of light source driving circuits transmit the status data that needs to be reading back to the last light source driving circuit through a data communication line formed of the serial input interface and the serial output interface of the light source driving circuit and/or a data communication line formed of the parallel interfaces of the light source driving circuit, the last light source driving circuit returns the reading back data of all light source driving circuits to the reading back data input interface of the controller.

Preferably, the control unit transmits a first detection command to the first driving circuit through the output interface, and the first driving circuit forwards the first detection command to the parallel interfaces of the current stage, or pulls down signals of the parallel interface for a period of time; each remaining driving circuit receives the first detection command through the parallel interface of the current stage or pulls down the signals of the parallel interface for a period of time; all driving circuits in each line call out the configuration parameters corresponding to the first detection command, and light LED lights electrically connected to the current output interface of the driving circuits to detect the circuits.

Preferably, the control unit transmits the second detection command to the first driving circuit through the output interface, and the first driving circuit forwards the second detection command to the serial output interface of the current stage; each remaining driving circuit receives the second detection command through the serial input interface of the current stage; all driving circuits in each line call out the configuration parameters corresponding to the second detection command, light the LED lights electrically connected to the current output interface of the driving circuit.

Preferably, the display system uses any one of a liquid crystal display panel using LED to provide back light and an LED display screen using LED as pixel units.

The present application provides a light source driving circuit for a display system, including: a plurality of light source driving circuits cascaded to each other to form a light source driving circuit, each light source driving circuit includes a serial input interface, a serial output interface, parallel interfaces, and at least one current output interface; the current output interface is connected to the plurality of LED lights to supply driving current; the serial input interface and the serial output interface of the plural light source driving circuits are cascaded with each other as a first channel of control commands or data transmission, the parallel interfaces of each driving circuit in the plurality of driving circuits are coupled to each other as a second channel of the control commands and data transmission, wherein the commands and data simultaneously transmitted by the first channel and the second channel are at least one of a configuration data packet, a brightness data packet, a detection data packet, and reading back commands.

Preferably, the serial input interface of the first driving circuit in each string light source driving circuit is configured for receiving commands or data of the control unit, taking output the address data required by the current stage, and repackaging the commands or data of the remaining driving circuits; the first driving circuit transmits the repackaged data packet simultaneously through the serial output interface and the parallel interfaces of the current stage.

Preferably, the serial input interface of the first driving circuit in each string light source driving circuit is configured for receiving the commands or data of the control unit, taking out the address data required by the current stage, and repackaging the commands or data of the remaining driving circuit; the first driving circuit transmits the repackaged data packet through the serial output interface of the current stage; and, all the parallel interfaces of the driving circuits in each light source driving circuit are configured for receiving the commands or data.

Preferably, the serial input interface of the first driving circuit of each string light source driving circuit is coupled to the first output interface of the control unit, and the serial input interface of each remaining driving circuit is coupled to the serial output interface of the previous driving circuit, and the parallel interfaces of each remaining driving circuit are coupled to the parallel interface of the first driving circuit, the serial output interface of the last driving circuit of each light source driving circuit is coupled to the reading back data input interface of the control unit for the returning and output of the reading back data.

Preferably, the serial input interface of the first driving circuit of each string light source driving circuit is coupled to the first output interface of the control unit, and the serial input interface of each remaining driving circuit is coupled to the serial output interface of the previous driving circuit; moreover, all parallel interfaces of each driving circuit are coupled to the second output interface of the control unit; the serial output interface of the last driving circuit of each string light source driving circuit is coupled to the reading back data input interface of the control unit for the returning and output of the reading back data.

Preferably, the light source driving circuit receives the transmitted packaged data packet through the serial input interface and the parallel interfaces, takes out the commands or data of the current stage according to the address of the current stage, and repackages the subsequent commands or data; it monitors data conditions of the serial output interface and the parallel interfaces of the current stage, so as to simultaneously transmit the repackaged new data packet through the serial output interface and the parallel interfaces.

Preferably, the light source driving circuit receives the repackaged data packet through the serial input interface and the parallel interfaces, and the light source driving circuit selects the data packet which arrives first at the two interfaces, takes out the commands or data belonging to the current stage according to the address of the current stage, then repackages the subsequent commands or data, monitors the data conditions of the serial output interface and parallel interfaces of the current stage, so as to simultaneously transmit the repackaged new data package through the serial output interface and parallel interfaces.

Preferably, the first driving circuit of each string light source driving circuit receives the address data, the first driving circuit takes out the address data required at the current stage, and then repackages the address data of the remaining driving circuit, and transmits the repackaged data packet through the serial output interface, and the light source driving circuit of the following stage sequentially transmits the address data.

Preferably, each driving circuit has a nonvolatile memory for storing the address of the driving circuit.

Preferably, each light source driving circuit generates the address data packet of the light source driving circuit of the subsequent stage after intercepting the address of the light source driving circuit of the current stage from the address data packet provided by the control unit, or performs accumulation or subtraction operation on the effective address data of the light source driving circuit of the current stage to obtain the address data packet of the subsequent light source driving circuit.

The present application improves the data transmission speed and reliability of the light source driving system by introducing transmission data in parallel at the driving circuit and employing a redundant transmission channel, which greatly reduces bad effects caused on the light source driving system by the faults in the life cycle of products.

BRIEF DESCRIPTION OF THE DRAWINGS

In order to illustrate embodiments of the present application or technical solutions in the prior art more clearly, the following will briefly introduce the accompanying drawings used in the embodiments or the prior art. Obviously, the following described accompanying drawings are merely other accompanying drawings that can be obtained by those of ordinary skill in the art according to the provided accompanying drawings without paying any creative efforts.

DETAILED DESCRIPTION OF THE EMBODIMENTS

The following will describe the present invention based on the embodiments. However, the present invention is not restricted to these embodiments. In the following detailed descriptions of the present invention, some specific details are described in great details. Those skilled in the art can totally understand the present invention without these details. In order to avoid confusing the essence of the present invention, the well-known methods, processes, flows, elements, and circuits are not described in detail.

Meanwhile, it should be understood that in the following description, "circuit" refers to a conductive loop composed of at least one element or sub-circuit through electrical connection or electromagnetic connection. When it is said that an element or circuit is "connected to" another element or the element/circuit is "connected between" two nodes, it can be directly coupled or connected to another element or there may be an intermediate element. The connection between the elements can be physical, logical, or a combination thereof. On the contrary, when it is said that the element is "directly coupled" or "directly connected" to another element, it means that there is no intermediate element between them.

Unless the context clearly requires, the words "include", "include" and the like in the entire description and claims shall be interpreted as inclusive, rather than exclusive or exhaustive; in other words, it means "including but not limited to".

In the description of the invention, it should be understood that the terms "first", "second", etc. are only used for the purpose of description and cannot be understood as indicating or implying relative importance. In addition, in the description of the invention, unless otherwise specified, "multiple" means two or more.

In the description of this text, the terms of "first LED driving circuit" and "last LED driving circuit", as well as "input port" and "output port" are defined according to the connection relationship between the LED driving circuit and the output port SDO of the control unit. Among them, the first LED driving circuit is not limited to an LED driving circuit in the first column of a string, but can also be an LED driving circuit assigned with an address first in the string.

Figure 1:
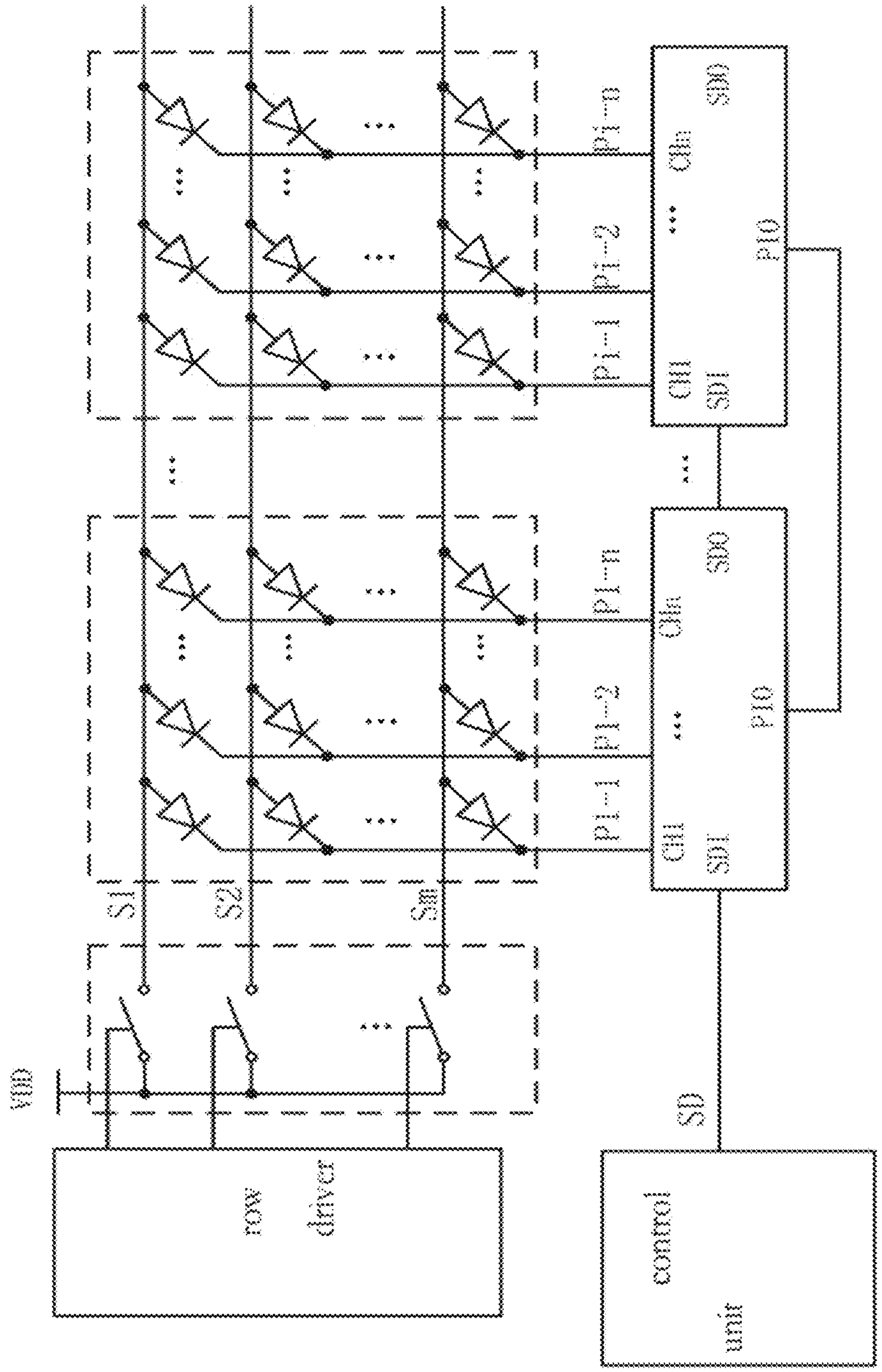
FIG. 1 is a schematic view of the backlight module according to the present invention.

FIG. 1 is a schematic diagram of a backlight module according to the present invention. The backlight module includes a control unit, a plurality of light source driving circuits, and a plurality of light source blocks corresponding to the plurality of light source driving circuits. Here, LED is used as the light source for illustration, but the light source is not limited to this.

If the backlight module is a liquid crystal display screen, the liquid crystal panel includes a TFT array substrate, a color filter, and a liquid crystal layer sandwiched between them. The TFT array substrate is configured for controlling the transmittance of the liquid crystal layer. The backlight module is located below the array substrate and serves as a light source to supply backlight, and can obtain brightness corresponding to the pixel gray scale after passing through the LCD panel. In this embodiment, a plurality of light source blocks respectively include a plurality of LED light sources arranged in an array, and the LED blocks themselves are also arranged in an array according to certain rules. Therefore, a surface light source is formed by using a plurality of point light sources.

In the display mode of the backlight module, the brightness data of the light source is output via the control unit. A plurality of current driving terminals (such as CH1 to CHn) of the plurality of light source driving circuits respectively apply constant current to the light source connected thereto. According to the brightness data of the light source, the duty cycle or amplitude of the current at the current drive end of the light source driving circuit can be adjusted to change the equivalent current of multiple light sources on the current light source string, so as to adjust the backlight brightness in different partitions.

The row driver is configured for driving whether the light source in each row receives the power supply voltage to emit light.

Figure 2:
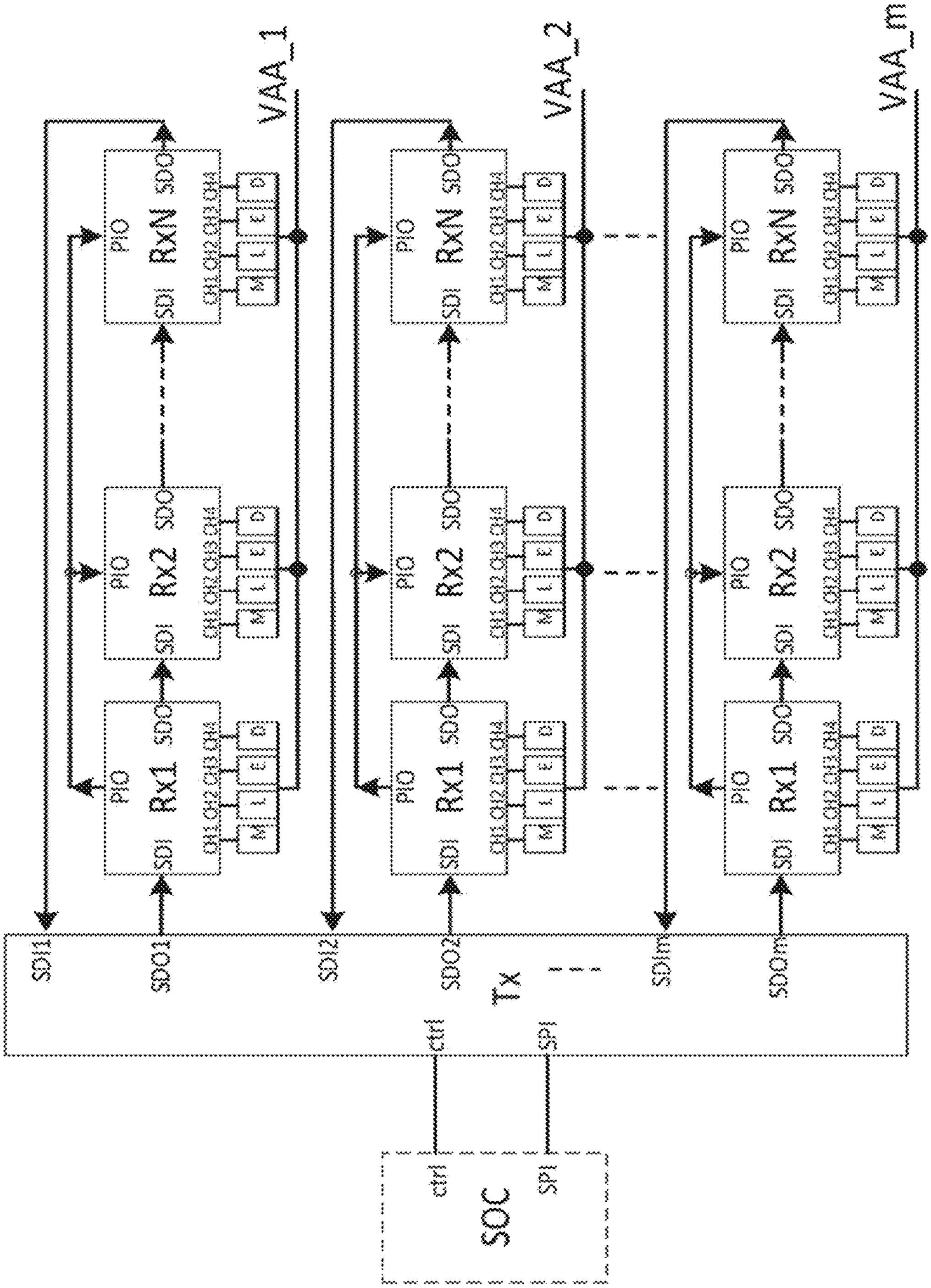
FIG. 2 is a structural schematic view of a first embodiment of the communication device of the display system according to the present invention.

Refer to FIG. 2, it is a structural diagram of an embodiment of the communication device of the display system according to the present invention, which includes a backlight control unit TX and a light source driving circuit Rx. In this embodiment, take the LED array driving circuit Rx as an example, which may comprising the serial communication line SDI-SDO, the parallel communication line PIO, the mini-LED array single MLED, and power supply line VAA sharing the same anode with the mini-LED. Here, the LED array driving circuit includes plural circuits, and each string corresponding LED array driving circuit includes plural LED driving circuits. RxN represents the $N^{th}$ LED driving circuit in a certain LED array driving circuit. The ground wire of the LED array driving circuit Rx is not illustrated.

Further, the backlight control unit TX at least includes: a data communication interface SPI and an interaction signal interface ctrl interconnected with the previous stage of image processing engine module SOC, output interfaces SDOx(x=1, 2, . . . , m) of the control commands or data commands and reading back data input interferes SDIx(x=1, 2, . . . , m) electrically connected to the following stage of LED array driving circuit, m being any natural number. At least one data communication interface SIP is connected to the data communication interface SIP of the previous stage of engine module SOD, and at least one interactive signal interface ctrl is connected to the ctrl signal interface of the previous stage of engine module SOC, and accomplishes information data interaction with the previous stage of SOC via two signal interfaces. In the backlight module, the commands output by the control unit include at least one of the brightness data, configuration data, address data, detection data, device address storage data packet, a reading back command data packet, and enable signals. In the display system, the commands output by the control unit include at least one of grayscale data, configuration data, address data, detection data, device address storage data packet, a reading back command data packet, and enable signals.

As shown in FIG. 2, each SDO interface in the backlight control unit Tx is connected to the SDI interface of the first driving circuit Rx1 in one string circuit. The so-called "string" refers to the collection of multiple LED driving circuits Rx connected in series with each other in a group through the SDI-SDO serial communication line. The LED driving system can be composed of at least one circuit, and the number of driving circuits connected in series in one circuit is at least one. Further, for each LED driving circuit Rx, it at least includes: a data input interface SDI, a data output interface SDO, a data transmission interface PIO, at least one current output channel CH (there are four exemplary channels in FIG. 2, CH1, CH2, CH3, CH4), a power supply interface, and a reference ground interface of the chip (not illustrated in the figure).

Preferably, the plural LED driving circuits are cascaded with each other to provide the serial communication bus SDI-SDO. In terms of physical connection, the serial communication bus SDI-SDO may have only one single ended signal data line. At this time, the data transmission is accomplished by the embedded clock technology. It may also be two or more single-ended signal lines, one of which is called clock line, and the other one or more is called data line. They cooperate with each other to complete data transmission; it may also be two differential signal lines. At this time, ultra-high speed data transmission is completed by the embedded clock technology, which can reduce EMI.

Preferably, the PIO ports of the plural LED driving circuits are connected to each other to form a parallel communication line PIO, which is a two-way tri-state port in physical connection.

Still refer to FIG. 2, except for the first driving circuit, the SDI interface of each remaining driving circuit Rx is connected to the SDO interface of the previous driving circuit Rx, and the SDI interface of the first driving circuit is connected to the SDO interface of the backlight control unit TX; the SDO interface of each driving circuit Rx is connected to SDI interface of the next driving circuit Rx, and SDO interface of the last driving circuit Rx can be selectively connected to SDI interface of backlight control unit Tx, and the PIO ports of all driving circuits Rx of each circuit are connected in parallel. It should be noted that the SDI port and SDO port of the LED driving circuit can be configured as one of the input port, the output port and the tri-state port according to the data flow direction. The current output channel CH is independently connected to the cathode of the respective light-emitting unit mini-LED array, and the anodes of the mini-LED array in a string are connected together and connected to the power supply VAA_x (x=1, 2, . . . , m); the anode power supply of the mini-LED can be connected together, or each string of anode power supply may supply power independently, or two or more strings of anodes can be connected together.

It should be noted that the image processing engine module SOC is the data source of the mini-LED backlight system, and it does not belong to the driving system of the present application. It is only used for the convenience of description to explain the principles. The control unit can be connected with the preceding stage of image processing engine SOC via the communication bus (SPI, LVDS or VBYONE) to receive image data or brightness data.

In one example, after the system is powered on, the control unit Tx and the LED driving circuit release reset. The preceding stage image processing engine SOC performs power on initialization according to the set power sequence. After the control unit Tx completes the initialization of the backlight system, the engine control module SOC sends the backlight data such as brightness data to the data communication interface SPI of the control unit Tx through the first output port SPI. After receiving and processing the brightness data, the control unit Tx transmits the brightness data to the first LED driving circuit Rx of a certain circuit. The first LED driving circuit Rx obtains the brightness data of current stage, converts the brightness data into the corresponding current size, and drives the corresponding mini-LED light emitting device to emit light. For example, according to the brightness data of the LED, the current at the current drive end of the LED driving circuit adjusts the duty cycle or the amplitude, and this can change the equivalent current of multiple LEDs on the current LED string to adjust the backlight brightness in different partitions. In addition, the first LED driving circuit intercepts and repackages the brightness data of the current stage, and transmits the processed data packets to the remaining driving circuit Rx of this circuit. After receiving the data packets, the remaining LED driving circuit Rx reads the brightness data, converts the brightness data to the corresponding current size, drives the corresponding mini-LED light-emitting devices to emit light, so as to display the corresponding data (images) on the backlight array. In particular, the engine control module SOC can also upgrade the backlight control unit Tx online through the first output port SPI, so as to accomplish the automatic upgrade of the control unit Tx function after delivery and improve user experience. The above takes the brightness data as an example, in the display system of the invention, other data sent by the control unit Tx, such as the configuration data, the detection data, etc., first passes through the first driving circuit, and then passes to the following stage of driving circuit through the first driving circuit.

Exemplarily, after the power on reset (POR) according to the set power on sequence, the control unit TX first assigns addresses for the LED array driving circuit Rx (corresponding to the address data), then configures the operating parameters of the array driving circuit Rx (the corresponding configuration data), and finally transmits the backlight data received by the data communication interface SPI to the driving circuit (corresponding to the display data or brightness data), so as to control the current of the output current channel of the driving circuit Rx, and the controlled processing of the mini-LED light emitting diodes connected to each current channel of the entire backlight system is completed. According to the above control process, the communication device of the display system can be divided into three stages on the whole: addressing stage, configuration stage, and luminous stage.

In an example, in the addressing phase, the control unit Tx sends the addressing data packet to the plurality of driving circuits Rx through the output port SDO to assign addresses to the plurality of driving circuits Rx. The addressing data packet at least includes the address data of the current driving circuit Rx. Each driving circuit Rx takes the corresponding address data in the received addressing data packet as the Rx address of the driving circuit of the current stage, and then automatically increases or decreases the address of the current stage by a fixed constant value (usually the increase is 1, or any natural number) as the address for receiving the next driving circuit Rx, and finally forms a new address data packet to be sent out through the data output interface SDO of the current stage.

Figure 3:
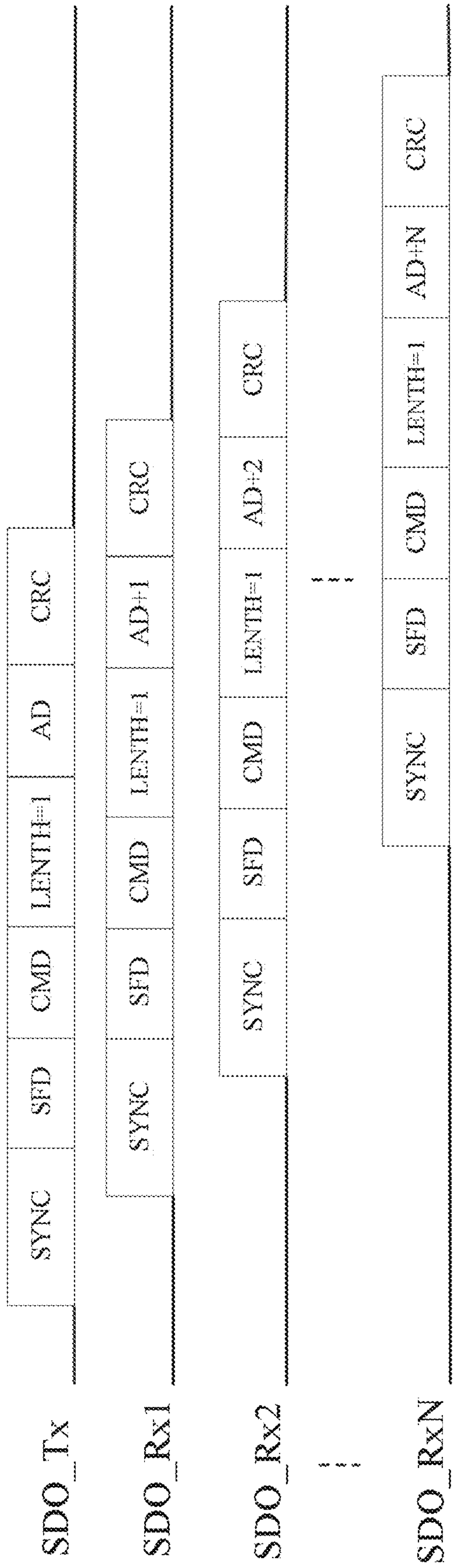
FIG. 3 is a schematic view of addressing a first address according to the addressing manner of the present invention.

Exemplarily, refer to FIG. 3, the implementation of the addressing manner can include the following steps:

1) The control unit Tx first sends an addressing data packet containing only the address of the driving circuit Rx electrically connected to the control unit Tx to the SDO output interface.
2) The first driving circuit Rx is connected with the SDO interface through the SDI interface to receive the addressing data packet, and analyzes the data coming from SDI interface according to the following rules:

The addressing data packet coming from the SDI interface intercepts the addressing data of the current stage according to the address data packet parsing rules, and stores it in the address register of the driving circuit of the current stage. Then, the received effective payload address data is increased or decreased by a fixed constant value (usually the increase is 1, or any natural number) and repackaged into a new address packet, then the reorganized new address data packet is sent through the SDO interface of the current stage;

The address data packet includes a preamble field, an effective payload, and a frame checksum CRC. The preamble field includes a synchronization flag SYNC and a frame start delimiter SFD. The effective payload includes an instruction type CMD, a data length LENGTH, and an effective payload address data AD. The repackaging of the address data packets, for example, includes the accumulation operation or the subtraction operation on the effective payload address data AD of the current address to obtain the subsequent address. For example, the increment or decrement of the accumulation operation is 1 or any natural number, as shown in FIG. 2, SDO_Rx1 is AD+1, SDO_Rx2 is AD+2, and so on, and the preamble field and subsequent address data in the address packet are repackaged into a new address packet.

For the address data coming from the SDI, Each driving circuit Rx will repackage and forward IT to the SDO interface of the current stage according to the above rules, and transmit it to the LED driving circuit of the next stage.

3) In this way, until the last driving circuit Rx takes out its own address data according to the rules in step 2), the assigning of the Rx addresses of a driving circuit is finished.

In addition to the above description, the addressing method can also have the following two forms, of which the process is similar to the transmission method described in above steps 2) and 3).

For example, addressing method 2: the control unit Tx pulls down or pulls up the signal of the SDO for a period of time and then sends it to the first driving circuit Rx electrically connected to the SDO interface of the control unit Tx as the addressing start signal; after receiving the addressing start signal, the driving circuit Rx fixes its address to a fixed value. The data rules of the address data packet are the same as those of Embodiment 1. Then, after the effective payload address data AD is automatically increased or decreased, it is repackaged to output the address of the LED driving circuit of the next stage through the SDO interface of the current stage of the driving circuit Rx, and so on, until the last driving circuit Rx completes the allocation of the address of the current stage.

Or addressing method 3: the control unit Tx sends an addressing packet containing all the Rx addresses of the driving circuit through the SDO interface. The first driving circuit Rx connected with the control unit Tx intercepts the data at a fixed location as the address of the current stage, and then repackages all the addresses of the subsequent driving circuit Rx, and outputs them to the next stage through the SDO interface. Each subsequent driving circuit Rx receives the data packet through the SDI interface, intercepts the data at a fixed location as the address of the current stage, then repackages all addresses of the subsequent driving circuit Rx, and outputs them to the next stage through the SDO interface. The repackaging of the address data packets includes, for example, obtaining the effective payload address data of the current stage from the address data packet, and repackaging the preamble field and subsequent address data in the address data packet to be a new address package.

Figure 4:
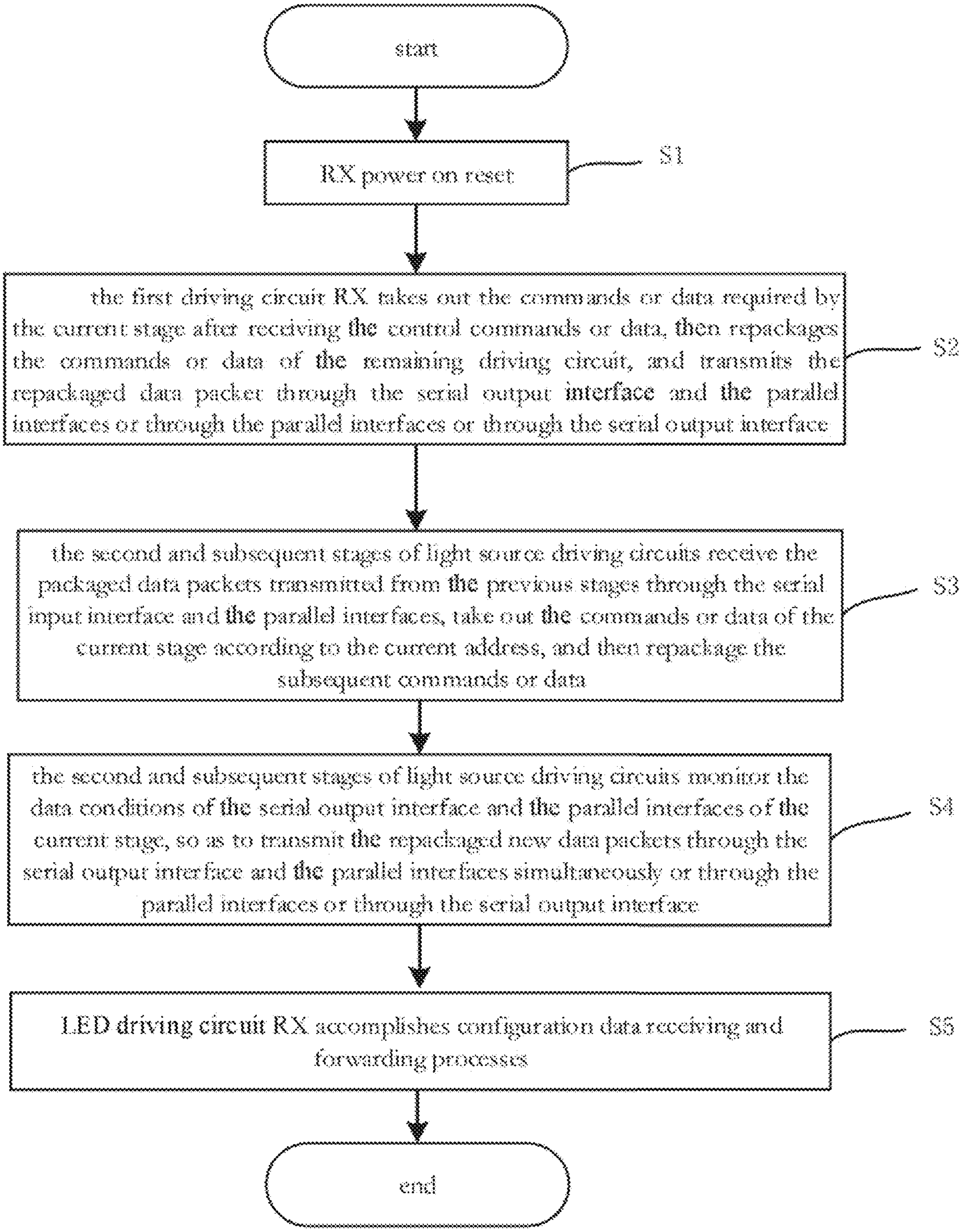
FIG. 4 is a schematic flow diagram of the configuration and data receiving according to the present invention.

After the addressing stage is finished, enter into the configuration stage:

In the configuration stage, the control unit Tx generates a series of control commands and sends them to each driving circuit Rx through the SDO interface, and configures the working parameters of each driving circuit Rx. The control commands can be configuration data transmission commands (including configuring the data packets). Refer to the flow chart shown in FIG. 3, the configuration process in the embodiment of the present invention is described as follows:

1) After the power on reset of the control unit Tx and the driving circuit Rx, in step S1 of FIG. 4, the control unit Tx first transmits a data packet containing the configuration of all driving circuit Rx to the SDO bus. The configuration data package includes a preamble field, an effective payload, and a frame checksum CRC. The preamble field includes a synchronization flag SYNC, a frame start delimiter SFD, and the effective payload includes the instruction type CMD, data length LENGTH, and chip operating parameter configuration values.

2) The first LED driving circuit only receives the configuration data packet of the preceding control unit through the data input interface SDI, but this is a case of data receiving behavior of the LED driving circuit, so the data packet processing flow of the LED driving circuit can be normalized, as in step S2 in FIG. 4. The normalized processing flow is shown in step 3).

3) Each driving circuit Rx can receive the configuration data packets through the SDI interface and PIO interface of the current stage, and analyze the data packets coming from these two interfaces according to the following rules:

The LED driving circuit RX monitors the data status of the PIO and SDI ports of the current stage, For data packets coming in from the SDI interface, the configuration data belonging to the current stage is retrieved according to the address of the current stage, and then the subsequent configuration data is repackaged to detect whether there is data transmission at the SDO interface of the current stage. If so, no operation is performed on the SDO. If not, check whether there is data input at the PIO interface of the current stage at the same time. If there is no data received, the reorganized new data packet is transmitted through SDO interface and PIO interface at the same time. If there is data input at the PIO interface, no operation is performed on the PIO interface, and the reorganized new data package will only be transmitted through the SDO interface.

For the data packets coming in from the PIO interface, the configuration data belonging to the current stage is retrieved according to the address of the current stage, and then the subsequent configuration data is repackaged. Meanwhile, check whether there is data transmission at the SDO interface. If not, the repackaged configuration data is transmitted through the SDO interface. If the SDO interface is transmitting data, no operation will be performed on the SDO interface.

In this way, for the configuration data packets coming from the SDI interface and the PIO interface, they are re-forwarded to the SDO interface or/and PIO interface to the next stage according to the above rules. Steps S3-S4 in FIG. 3.

4) This is done repeatedly until the last driving circuit Rx, and the configuration data of the current stage is taken out according to the rules in step 3). Step S5 in FIG. 4.

In this way, except for the first driving circuit, the configuration data of each other driving circuit Rx will have two link inputs and two circuits of data outputs, namely, PIO interface input and SDI interface input. After being processed by the driving circuit Rx, the configuration data will be output from the SDO interface and the PIO interface. It ensures that the configuration data will not be configured because the PIO link or SDI link is damaged, which further makes the driving circuit Rx to be uncontrolled, thus improving the reliability of receiving data by the driving circuit Rx.

Such configuration method ensures the speed and reliability of data transmission through the concurrent and redundant transmission of Rx data of the driving circuit. For the above redundant transmission method, it can also be applied into other display systems, not limited to the LED drive system architecture of this embodiment, as long as the input and output architecture of two configuration data signals are implemented. For example, the control unit transmits the configuration data to each driving circuit through a concurrent data interface, and each driving circuit obtains dual link transmission of the configuration data through the SDI-SDO link and the PIO concurrent link, and the data dual link transmission employing the present invention is within the protection scope of the present invention.

In the configuration phase, the second and subsequent light source driving circuits can also process the received data as follows:

The second and subsequent LED driving circuits in each LED driving circuit receive the repackaged data packets through the serial input interface and the parallel interface. The LED driving circuit selects the data packets that arrive first at the two interfaces, that is, if the data packets arriving first is at the serial input interface, the data packet coming from the parallel input interface will not be received or the data packet will be shielded; if the data packet arriving first is at the parallel interface, the data packet coming from the serial input interface will not be received or the data packet will be shielded.

Then, the commands or data belonging to the current stage are taken out according to the address of the current stage, and then the subsequent commands or data are repackaged; the data condition at the serial output interface and the parallel interface data of the current stage are monitored to transmit the repackaged new data packet through the serial output interface and the parallel interface at the same time. The forwarding method is the same as that in steps 1-4 of the above embodiments.

After the configuration is finished, enter into the luminous stage:

At the luminous stage, the driving circuit Rx converts the received backlight display data, such as brightness data, into the corresponding current size, and outputs it to the corresponding current channel to control the luminance of the mini-LED. The transmission and processing process of brightness data are the same as those in the configuration phase, both of which are transmitted through dual links, which is omitted here. Similarly, the brightness data transmitted through the dual link ensures that the brightness data will not be transmitted due to the damage of the PIO link or SDI link, thus improving the reliability of receiving data by the driving circuit Rx.

Furthermore, the backlight control unit Tx can also transmit a reading back command through the interface SDO to obtain the status information of a certain driving circuit on the corresponding circuit (such as the open/short status and temperature information, etc. of the driving circuit Rx). The control unit Tx transmits the reading back command through the output interface SDOx (x=1, 2, m) of the serial bus. The transmission process of the reading back command is the same as that of the configuration data, so that each driving circuit Rx can obtain the reading back command through dual links. According to the reading back command, the driving circuit Rx generates the reading back data. The reading back data is returned to the SDI port of the control unit Tx through the serial communication bus SDO-SDI of the driving circuit Rx or the reading back data is returned to the last driving circuit RxN through the parallel communication bus PIO in a time-division manner. Time division multiplexing can be understood as transmitting display data commands and reading back commands at different times.

Finally, after receiving via the PIO, the driving circuit RxN directly returns to the SDI interface of the control unit Tx through the SDO interface, or the reading back data is returned to the SDO port of the control unit Tx through reverse transmission of the SDI SDO bus of the driving circuit Rx (at this time, both SDI and SDO ports are bidirectional ports).

A reading back implementation is as follows:

1) After the power on reset of the control unit Tx and driving circuit Rx, the control unit Tx sends a data packet containing reading back commands to the serial bus SDO. The data packet at least includes: device address start_id of the driving circuit Rx that needs to return data, whether it is the returned data of the last stage of driving circuit Rx and the address of the returned data.
2) The driving circuit Rx receives the reading back command data, and the transmission manner of the reading back command data packet is the same as that of the above configuration data command, that is, each driving circuit obtains the dual link transmission of the configuration data through the link of the SDI-SDO and the parallel link of the IPO, which is not repeated here.
3) In this way, by the process of step 2), all driving circuits Rx complete the acquisition of the reading back control word in the reading back command data packet.
4) Each LED driving circuit determines whether to return the reading back data of the current stage to the control unit according to whether the address of this stage is consistent with the address of the device that needs to return data in the reading back commands, The plurality of LED driving circuits transmit the status data to be read back to the last LED driving circuit via the data communication line formed of the serial input interface and the serial output interface of the LED driving circuit and/or the data communication line formed of the parallel interface of the LED driving circuit, The serial output interface of the last driving circuit of each string LED driving circuit returns the reading back data of all LED driving circuits of this circuit for output.

In this way, the control unit Tx transmits the reading back data of the corresponding address of the reading back command to the driving circuit RxN of the last stage through the SDI-SDO link or/and directly arrives at the driving circuit RxN through the PIO link.

5) After receiving the reading back command, the driving circuit RxN of the last stage pulls up the data flag signal rb_ind waiting for return to be valid. After the driving circuit RxN of the last stage receives the reading back packet, it transmits the reading back packet to the SDO port and makes the rb_ind signal be invalid, and ignores the subsequently received reading back packets.

The reading back data packet is transmitted to the SDI port of the control unit Tx through the SDO port of the driving circuit RxN, and the control unit Tx parses the read back data packet to complete the acquisition of the reading back information.

Figure 5:
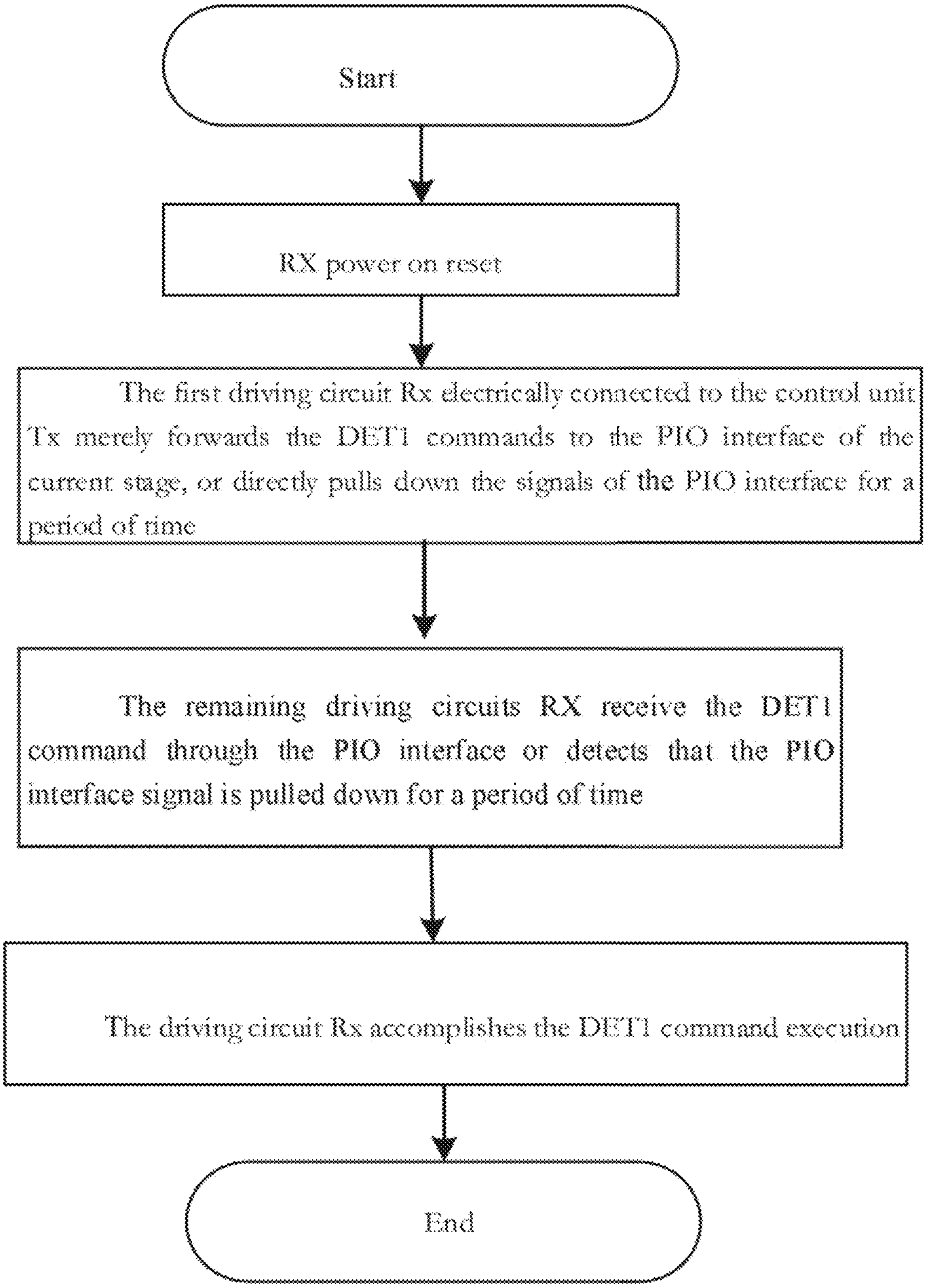
FIG. 5 is a schematic flow diagram of the DET1 command according to the present invention.

Furthermore, in the present application, in order to conveniently confirm the defects of each driving circuit Rx and other peripheral interconnection devices during the production and manufacturing process, defective points are quickly picked out, thus speeding up the modification process; the present application proposes a detection scheme. The control unit Tx only needs to send the DET1 lighting command once to complete the detection of all the bad points on the backlight system. It can distinguish whether the bad problems are caused by the introduction of the driving circuit Rx or the introduction of the surrounding devices, so as to solve the problems conveniently and rapidly. The flow chart is shown in FIG. 5, and the process is described as follows 1) The control unit Tx transmits the data package of DET1 lighting command containing only the control data of the driving circuit Rx1 to the serial communication bus SDO.
2) The driving circuit Rx first electrically connected with the control unit Tx only forwards the DET1 command to the PIO interface of the current stage, or directly pulls down the signal of the PIO interface for a period of time, and no longer forwards it to the SDO interface.
3) Each driving circuit Rx receives the DET1 command through the PIO interface or detects that the PIO interface signal is pulled down for a period of time. The driving circuit Rx calls out the configuration parameters corresponding to the DET1 command, wherein the configuration parameters corresponding to the DET1 command can be transmitted to each driving circuit by the control unit Tx at the configuration phase, and actively light the LED beads electrically connected to the current channel of the driving circuit Rx.
4) If the driving circuit Rx is well electrically connected to the surroundings, DET1 can light all LED lights. If one or several LED lights are off, record their positions, and DET1 completes the determination of LED positions of all defective points.

In this step, it may judge preliminary whether it is the problem of the driving circuit Rx or the surrounding components according to whether the LED lights that are not lighted belong to the same driving circuit Rx;

If some LED lights belonging to different current channels of the same driving circuit Rx are lighted and some are not, it can be determined that it is the problem of the surrounding devices.

If all LEDs belonging to different current channels of the same driving circuit Rx are not lighted, it can be determined that it is a problem with the link channel of the PIO or the driving circuit Rx, and it needs the DET2 command to determine whether it is a problem of the driving circuit Rx or the surrounding devices.

Figure 6:
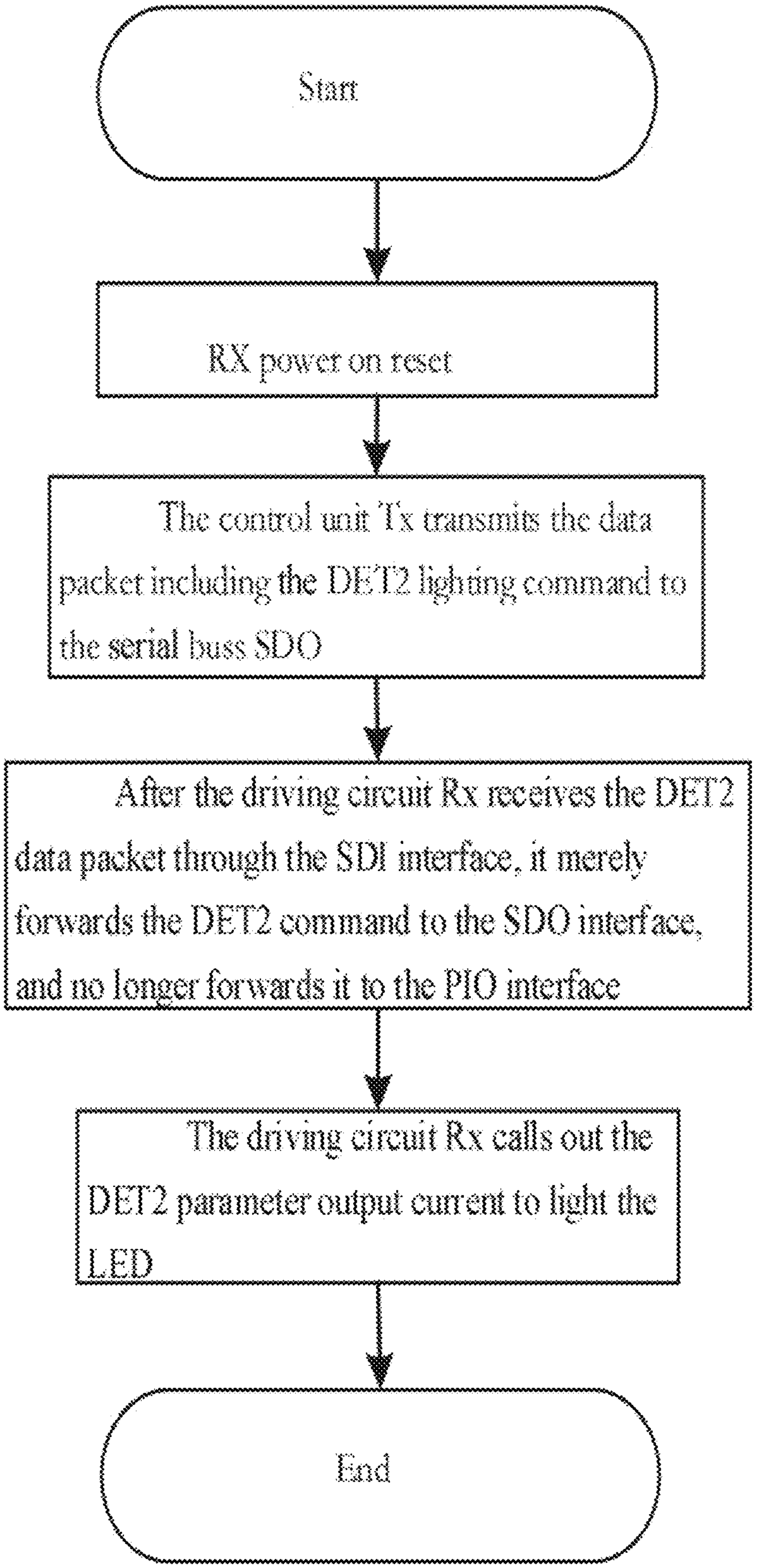
FIG. 6 is a schematic flow diagram of the DET2 command according to the present invention.

The control unit transmits the DET2 command again to enter the next step of detection. The flow chart is shown in FIG. 6, and the process is as follows.

5) The control unit Tx transmits the data package including the DET2 lighting command to the serial bus SDO.
6) After the driving circuit Rx receives the DET2 data packet through the SDI interface, it merely forwards the DET2 command to the SDO interface, and no longer forwards it to the PIO interface. The current stage calls out the corresponding default parameters according to the DET2 command to light.
7) In this way, it can determine whether the bad point is the bad driving circuit Rx or bad surrounding devices according to whether the next stage driving circuit Rx adjacent to the bad point is lighted. If some lights of the next stage driving circuit Rx are lighted, then the surrounding devices are damaged. If the lights of the previous stage driving circuit Rx can be lighted while the next stage driving circuit Rx cannot be lighted, it is a problem of the driving circuit Rx.

Figure 7:
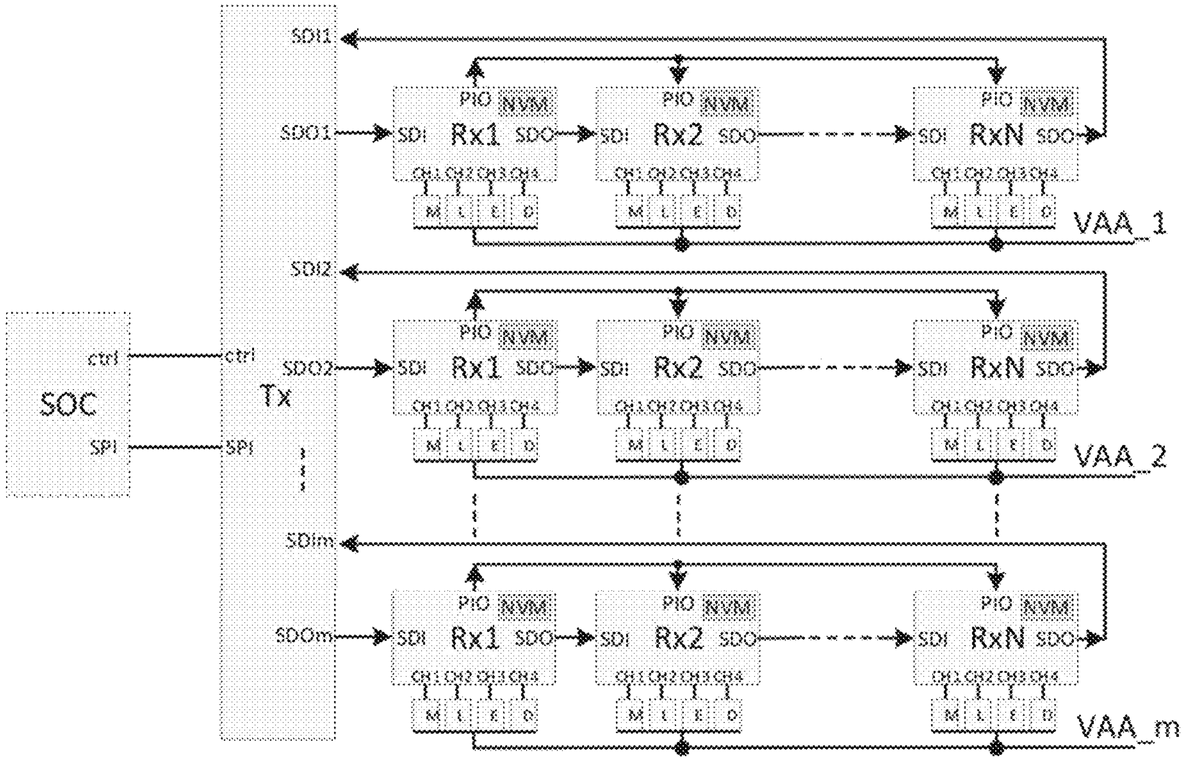
FIG. 7 is a structural schematic view of a second embodiment of the communication device of the display system according to the present invention.

Further, refer to FIG. 7, it is a communication device according to the second embodiment of the present invention. Each driving circuit includes a non-volatile memory device (NVM); after the LED driving system completes the confirmation that all links and functions are correct in the initial production stage, it can transmit the device address storage commands to each driving circuit Rx through the control unit Tx. After each driving circuit unit Rx obtains the address data of the current stage, it will burn the address of the current LED driving circuit to the non-volatile memory device (NVM) to complete the solidification of the address of each driving circuit. The transmission mode of address storage command data packet transmitted by the control unit Tx to each driving circuit and the above configuration data command can be the same, which is not repeated here.

In this way, each driving circuit stores the address of its own device. In the subsequent transmission of configuration data and brightness data, the redundant transmission of data is finished via the SDI-SDO link and the PIO link. This embodiment can also ensure that the device address of the driving circuit is unique and reliable when the serial input and serial output buses are damaged in later stages. The subsequent link redundant transmission of data packets transmitted in parallel is not affected by the fault driving circuit. Each driving circuit can independently complete the transmission of configuration data and brightness data, realize the light emitting function, and can easily detect the fault driving circuit.

It can also be inferred by those skilled in the art that when the LED driving system is first used, after it confirms the respective links and function are correct according to the address phase, it fixes the address of the current LED driving circuit to the non-volatile memory device (NVM) to complete the solidification of the device address, and then the configuration data and display data are transmitted and used according to the solidified address.

By the embodiments of the application, no matter in the addressing stage, the configuration stage or the display stage, if the SDI input or PIO input of a certain driving circuit Rx fails, then due to the redundant transmission of the link and the storage of the device address, it can receive the corresponding data packets through at least one of the PIO or SDI, ensuring reliable transmission of data, so that the configuration data or display data can be transmitted smoothly according to the configuration method of the present application. The present application improves the data transmission reliability of the LED driving system by introducing redundant transmission channels and device address storage functions at the driving circuit, and greatly reduces the adverse impact of the late defects in the product life cycle on the LED driving system.

The above are merely preferred embodiments of the present invention, and are not intended to restrict the present invention. To those skilled in the art, the present invention can have various changes and variations. Any modification, equivalent replacement, improvement, etc. made within the spirits and principles of the present invention shall be included in the protection scope of the invention.

What is claimed is:

1. A communication device for a display system, comprising:

a control unit, wherein the control unit comprises a first output interface for transmitting control commands or data and a reading back data input interface, the control commands comprising at least one of a configuration data packet, a brightness data packet, a detection data packet, address data, a device address storage data packet, and reading back commands; and at least one string light source driving circuit, each string light source driving circuit of the at least one string light source driving circuit comprising a plurality of light source driving circuits, and each light source driving circuit of the plurality of light source driving circuits comprises a serial input interface, a serial output interface, parallel interfaces, and at least one current output interface, the current output interface comprising at least two current output channels, each of the at least two current output channels being independently connected to a cathode of a respective light-emitting unit mini-LED array, the at least two current output channels being separate from the parallel interfaces and the serial input and output interfaces, wherein the serial input interface and the serial output interface of the plurality of light source driving circuits are cascaded with each other as a first channel of the control commands and data transmission, the parallel interfaces of each light source driving circuit in the plurality of light source driving circuits are coupled with each other as a second channel of the control commands and data transmission, wherein the control commands and data transmitted simultaneously by the first channel and the second channel are at least one of the configuration data packet, the brightness data packet, the detection data packet and the reading back commands, wherein a first driving circuit of the at least one string light source driving circuit is configured to only receive configuration data packets from the control unit via the serial input interface, and wherein each subsequent light source driving circuit is configured to receive a configuration data packet via the serial input interface and a parallel interface of the parallel interfaces.

2. The communication device for the display system of claim 1, wherein the control unit transmits the address data to a first driving circuit of the string light source driving circuit via the first output interface, the first driving circuit takes out the address data required by a current stage, and then repackages the address data of remaining driving circuits to obtain repackaged data packets, and transmits the repackaged data packets through the serial output interface, and a light source driving circuit of a following stage transmits the address data sequentially.

3. The communication device for the display system of claim 2, wherein, the control unit transmits a device address storage command to each light source driving circuit through the first output interface, and each light source driving circuit burns an assigned address data to a storage device of the each light source driving circuit.

4. The communication device for the display system of claim 1, wherein the control unit further comprises a second output interface, wherein the control unit transmits at least one of the configuration data packet, the brightness data packet, the detection data packet and the reading back commands to the first driving circuit through the first output interface, then the plurality of light source driving circuits sequentially transmit backwards through a data transmission channel formed of serial input interfaces and serial output interfaces, and the control unit transmits at least one of the configuration data packet, the brightness data packet, the detection data packet and the reading back commands to the parallel interfaces of all the light source driving circuits through the second output interface.

5. The communication device for the display system of claim 4, wherein, a first driving circuit serial input interface in the string light source driving circuit is coupled to the first output interface of the control unit, seral input interfaces of each of the remaining light source driving circuits are coupled to a serial output interface of a previous light source driving circuit, and the parallel interfaces of each of the remaining light source driving circuits are coupled to a parallel interface of the first driving circuit, last driving circuit serial output interfaces of the string light source driving circuit are connected to the reading back data input interface of the control unit.

6. The communication device for the display system of claim 4, wherein the parallel interfaces of the plurality of light source driving circuits are bi-directional tri-state ports.

7. The communication device for the display system of claim 4, wherein, after the control unit transmits the reading back commands to the light source driving circuit, the light source driving circuit that currently receives the reading back commands determines whether to return reading back data of a current stage to the control unit according to whether an address of the current stage is consistent with an address of a device that needs to return data in the reading back commands, the plurality of light source driving circuits transmit status data that needs to be read back to a last light source driving circuit through a data communication line formed of the serial input interface and the serial output interface of the light source driving circuit and/or a data communication lime formed of the parallel interfaces of the light source driving circuit, the last light source driving circuit returns the reading back data of all light source driving circuits to the reading back data input interface of the control unit.

8. The communication device for the display system of claim 1, wherein, the control unit transmits at least one of the configuration data packet, the brightness data packet, the detection data packet and the reading back commands to the first driving circuit of the string light source driving circuit through the first output interface, the first driving circuit takes out the control commands or data required by a current stage after receiving the control commands or data through the seral input interface, then repackages subsequent control commands or data of remaining light source driving circuits, and transmits the repackaged configuration data packets through the serial output interface and parallel interfaces of the current stage, and the light source driving circuits of a second and following stages receive the control commands or data through the serial input interface and the parallel interfaces of the current stage, take out the control commands or data required by the current stage, then repackage subsequent control commands or data of the remaining driving circuits, and transmit the repackaged configuration data packet through the serial output interface and the parallel interfaces of the current stage.

9. The communication device for the display system of claim 8, wherein, a first driving circuit serial input interface of the string light source driving circuit is coupled to the first output interface of the control unit, a serial input interface of each of the remaining driving circuits is coupled to a serial output interface of a previous light source driving circuit, the parallel interfaces of each driving circuit are all coupled to a second output interface of the control unit, a last driving circuit serial output interface of the string light source driving circuit is connected to the reading back data input interface of the control unit.

10. The communication device for the display system of claim 1, wherein, the light source driving circuit works at an addressing phase, a configuration phase, and a luminous phase successively;

the control unit outputs the address data at the addressing phase, outputs configuration data at the configuration phase, and outputs brightness data at the luminous phase.

11. The communication device for the display system of claim 1, wherein the control unit transmits a first detection command to the first driving circuit through the first output interface, and the first driving circuit forwards the first detection command to the parallel interfaces of a current stage, or pulls down signals of a parallel interface of the current stage for a period of time, each remaining light source driving circuit receives the first detection command through the parallel interfaces of the current stage or pulls down the signals of the parallel interface of the current stage for a period of time, all light source driving circuits in each line call out configuration parameters corresponding to the first detection command, and light light emitting diode (LED) lights electrically connected to a current output interface of the light source driving circuits to detect the light source driving circuits.

12. The communication device for the display system of claim 1, wherein, the control unit transmits a second detection command to the first driving circuit through the first output interface, and the first driving circuit forwards the second detection command to the serial output interface of a current stage, each remaining light source driving circuit receives the second detection command through the serial input interface of the current stage, all light source driving circuits in each line call out configuration parameters corresponding to the second detection command, light light emitting diode (LED) lights electrically connected to a current output interface of the light source driving circuit.

13. The communication device for the display system of claim 1, wherein the display system uses any one of a liquid crystal display panel using a light emitting diode (LED) to provide back light and an LED display screen using LED as pixel units.

14. A light source driving circuit for a display system, comprising:

a plurality of light source driving circuits cascaded to each other to form a string light source driving circuit, each light source driving circuit comprises a serial input interface, a serial output interface, parallel interfaces, and at least one current output interface, the current output interface comprising at least two current output channels, each of the at least two current output channels being independently connected to a cathode of a respective light-emitting unit mini-LED array, the at least two current output channels being separate from the parallel interlaces and the serial input and output interfaces, the current output interface is connected to a plurality of light emitting diode (LED) lights to supply driving current, the serial input interface and the serial output interface of each of the plurality of light source driving circuits are cascaded with each other as a first channel of control commands or data transmission, the parallel interfaces of each light source driving circuit in the plurality of light source driving circuits are coupled to each other as a second channel of the control commands and data transmission, wherein the control commands and data simultaneously transmitted by the first channel and the second channel are at least one of a configuration data packet, a brightness data packet, a detection data packet, and reading back commands, wherein a first driving circuit of the string light source driving circuit is configured to only receive configuration data packets via a serial input interface, and wherein each subsequent light source driving circuit is configured to receive a configuration data packet from a control unit via a serial input interface and a parallel interface of the parallel interfaces.

15. The light source driving circuit of claim 14, wherein, the serial input interface of the first driving circuit in the string light source driving circuit is configured for receiving commands or data of the control unit, and the first driving circuit in the string light source driving circuit is configured for taking out address data required by a current stage, and repackaging subsequent commands or data of remaining driving circuits, the first driving circuit transmits the repackaged data packet simultaneously through the serial output interface and the parallel interfaces of the current stage.

16. The light source driving circuit of claim 15, wherein the serial input interface of the first driving circuit of the string light source driving circuit is coupled to a first output interface of the control unit, and a serial input interface of each remaining light source driving circuit is coupled to a serial output interface of a previous light source driving circuit, and the parallel interfaces of each remaining light source driving circuit are coupled to a parallel interface of the first driving circuit, the serial output interface of a last driving circuit of the string light source driving circuit is coupled to a reading back data input interface of the control unit for returning and output of reading back data, wherein the control unit is only connected to the first driving circuit by the serial input interface of the first driving circuit and each light source driving circuit of the plurality of light source driving circuits is connected to each other by the parallel interfaces.

17. The light source driving circuit of claim 14, wherein the serial input interface of the first driving circuit in the string light source driving circuit is configured for receiving control commands or data of the control unit, taking out address data required by a current stage, and repackaging subsequent control commands or data of remaining driving circuits;

the first driving circuit transmits the repackaged data packet through the serial output interface of the current stage; and all the parallel interfaces of the driving circuits in the string light source driving circuit are configured for receiving the commands or data.

18. The light source driving circuit of claim 17, wherein the serial input interface of the first driving circuit of the string light source driving circuit is coupled to a first output interface of the control unit, and a serial input interface of each remaining light source driving circuit is coupled to a serial output interface of a previous light source driving circuit, all parallel interfaces of each light source driving circuit are coupled to a second output interface of the control unit, the serial output interface of a last driving circuit of the string light source driving circuit is coupled to a reading back data input interface of the control unit for returning and output of a reading back data.

19. The light source driving circuit of claim 14, wherein, the light source driving circuit receives a transmitted packaged data packet through the serial input interface and the parallel interfaces, and the light source driving circuit takes out control commands or data of a current stage according to an address of the current stage, and repackages subsequent commands or data, monitors data conditions of the serial output interface and the parallel interfaces of the current stage, to simultaneously transmit a repackaged new data package through the serial output interface and the parallel interfaces.

20. The light source driving circuit of claim 14, wherein, the light source driving circuit receives a repackaged data packet through the serial input interface and the parallel interfaces, and the light source driving circuit selects a data packet which arrives first at one of the serial input interface and the parallel interfaces, the light source driving circuit takes out control commands or data belonging to a current stage according to an address of the current stage, then repackages subsequent commands or data, monitors data conditions of the serial output interface and parallel interfaces of the current stage, to simultaneously transmit a repackaged new data package through the serial output interface and the parallel interfaces.

21. The light source driving circuit of claim 14, wherein, the first driving circuit of the string light source driving circuit receives address data, the first driving circuit takes out the address data required at a current stage, then repackages subsequent address data of remaining light source driving circuits, and transmits a repackaged address data packet through the serial output interface, and the light source driving circuit of a following stage sequentially transmits the repackaged address data packet.

22. The light source driving circuit of claim 21, wherein each driving circuit has a nonvolatile memory for storing an address of the light source driving circuit.

23. The light source driving circuit of claim 21, wherein each light source driving circuit generates an address data packet of the light source driving circuit of a subsequent stage after intercepting an address of the light source driving circuit of the current stage from an address data packet provided by the control unit, or performs accumulation or subtraction operation on an effective address data of the light source driving circuit of the current stage to obtain an address data packet of a subsequent light source driving circuit.

* * * * *